(12) United States Patent
Cohen

(10) Patent No.: US 8,562,182 B2
(45) Date of Patent: Oct. 22, 2013

(54) LIGHTING FIXTURE AND METHOD FOR CREATING VISUAL EFFECTS AND METHOD FOR CREATING A DISTORTED IMAGE

(75) Inventor: Eli Cohen, Sunny Isles Beach, FL (US)

(73) Assignee: FacesMe, LLC, Hollywood, FL (US)

( * ) Notice: Subject to any disclaimer, the term of this patent is extended or adjusted under 35 U.S.C. 154(b) by 197 days.

(21) Appl. No.: 12/822,268

(22) Filed: Jun. 24, 2010

(65) Prior Publication Data
US 2011/0002128 A1 Jan. 6, 2011

Related U.S. Application Data

(60) Provisional application No. 61/222,194, filed on Jul. 1, 2009.

(51) Int. Cl.
| F21V 3/00 | (2006.01) |
| F21V 5/00 | (2006.01) |
| F21V 7/04 | (2006.01) |
| G09F 13/18 | (2006.01) |
| A47G 1/06 | (2006.01) |

(52) U.S. Cl.
USPC .......... 362/311.06; 362/605; 40/546; 40/743; 40/800

(58) Field of Classification Search
USPC ............... 362/311.06, 125, 605; 40/743, 800; 428/13–14
See application file for complete search history.

(56) References Cited

U.S. PATENT DOCUMENTS

| 2,334,750 A | 11/1943 | Cerracchio |
| D163,853 S | 7/1951 | Cerracchio |
| 2,663,960 A | 12/1953 | Cerracchio |
| 3,419,986 A | 1/1969 | Maze |
| 3,783,544 A * | 1/1974 | Brody .............................. 40/716 |
| 4,469,726 A | 9/1984 | Niinivuo |
| 4,715,137 A * | 12/1987 | Scheve ........................... 40/546 |
| 5,040,005 A | 8/1991 | Davidson et al. |
| 5,265,357 A * | 11/1993 | Yu ................................... 40/714 |
| 5,280,305 A | 1/1994 | Monroe et al. |

(Continued)

FOREIGN PATENT DOCUMENTS

EP 1777255 A2 4/2007

OTHER PUBLICATIONS

International Search Report dated Feb. 11, 2011.

*Primary Examiner* — David J Makiya
(74) *Attorney, Agent, or Firm* — Laurence A. Greenberg; Werner H. Stemer; Ralph E. Locher

(57) ABSTRACT

A lighting fixture and method for creating visual effects include a light box having an interior, a reflective inner surface and an opening, a plate covering the opening, a 3-dimentional image on the plate having a first depth, at least one light source disposed in the interior for illuminating the image with evenly spread light. The light source is disposed at a second depth behind the image. A ratio of first to second depths is between 7:7 and 7:21. A plurality of interchangeable plates may be provided with respective 3-dimentional images for creating different effects. A method for creating a distorted image includes preparing a 2-dimensional image, sculpting a 3-dimensional model, vacuum forming and running a 3-dimentional grid, drawing a distorted outline onto a 2-dimentional grid with photo management software, digitally matching and stretching an original image to match the outline and removing the outline leaving the distorted image.

35 Claims, 17 Drawing Sheets

(56) References Cited

U.S. PATENT DOCUMENTS

| | | |
|---|---|---|
| 5,407,391 A | 4/1995 | Monroe et al. |
| 5,555,654 A * | 9/1996 | Hermann .................. 40/714 |
| 5,763,102 A | 6/1998 | Yau |
| 5,782,698 A | 7/1998 | Keller |
| 5,923,469 A | 7/1999 | Machtig et al. |
| 6,037,064 A | 3/2000 | Vicovanu et al. |
| 6,227,935 B1 | 5/2001 | Smith et al. |
| 6,251,525 B1 | 6/2001 | Yau |
| D476,790 S | 7/2003 | Ruiz, Jr. |
| 6,635,196 B1 | 10/2003 | Goggins |
| 6,769,783 B2 | 8/2004 | Huang |
| 6,854,872 B2 * | 2/2005 | Davenport .................. 362/565 |
| 7,080,918 B2 * | 7/2006 | Rowland et al. ............ 362/125 |
| 7,703,227 B2 | 4/2010 | Carlson |
| 2002/0023325 A1 | 2/2002 | Fant et al. |
| 2002/0133993 A1 * | 9/2002 | Mueller .................. 40/714 |
| 2003/0035294 A1 | 2/2003 | Szilagyi |
| 2005/0007754 A1 | 1/2005 | Creel |
| 2005/0069682 A1 * | 3/2005 | Tseng .................. 428/195.1 |
| 2006/0034083 A1 | 2/2006 | Chung |
| 2006/0254156 A1 | 11/2006 | Targetti |
| 2007/0127230 A1 | 6/2007 | Chung et al. |
| 2007/0217186 A1 | 9/2007 | Liao |
| 2007/0289180 A1 | 12/2007 | Johnson |
| 2008/0034633 A1 * | 2/2008 | Tang .................. 40/714 |
| 2008/0163529 A1 * | 7/2008 | Beeman et al. .................. 40/714 |
| 2008/0186732 A1 | 8/2008 | Awai et al. |
| 2009/0232360 A1 | 9/2009 | Marcinkowski et al. |

* cited by examiner

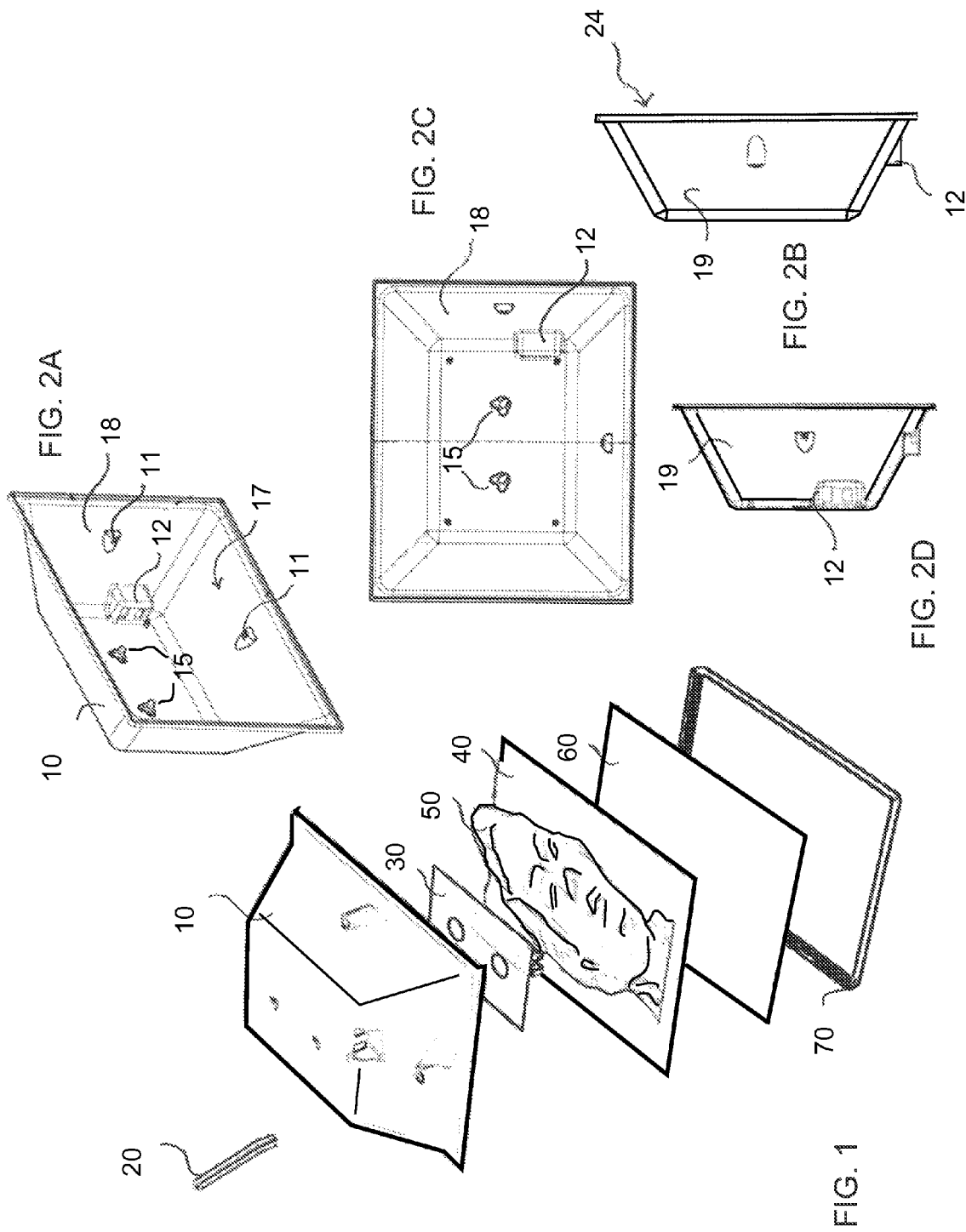

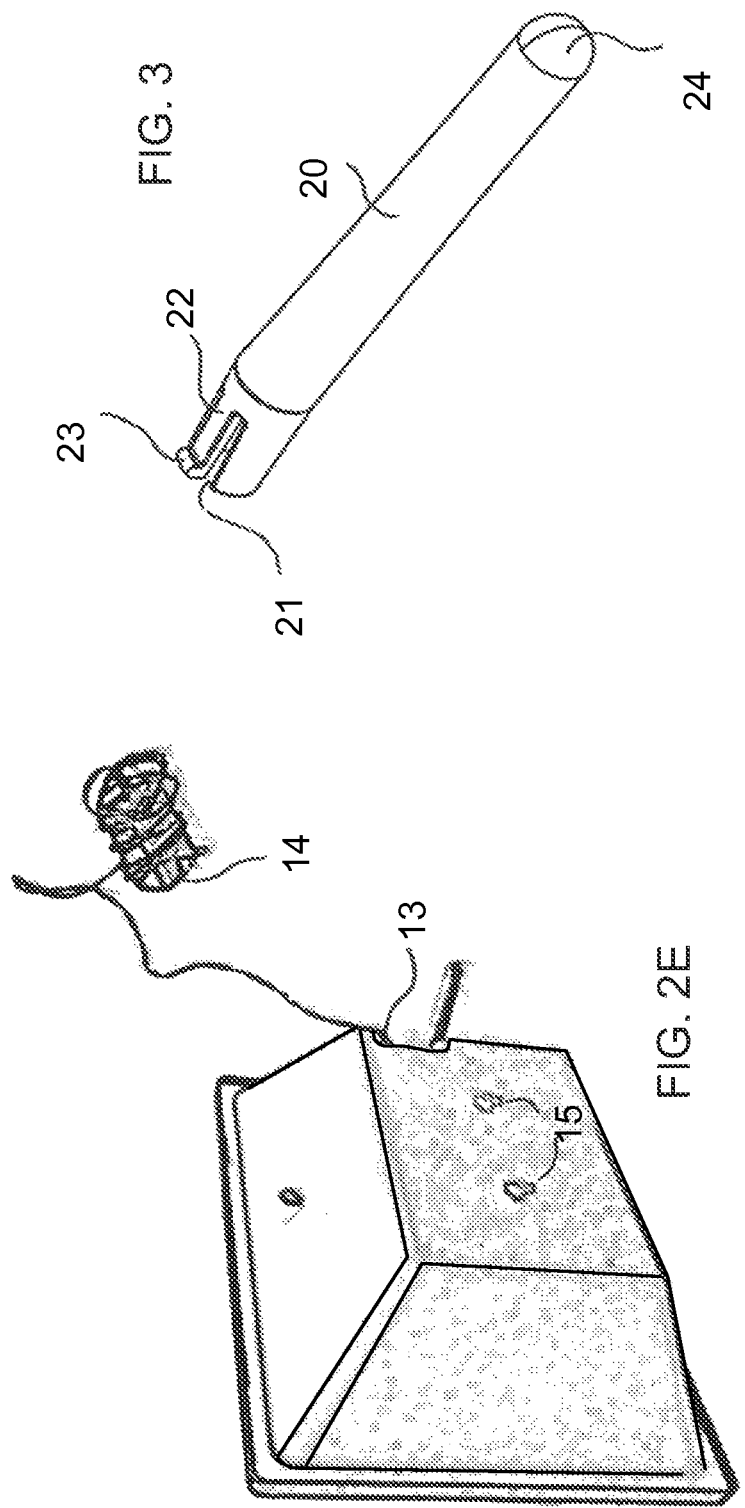

LIGHTING FIXTURE AND METHOD FOR CREATING VISUAL EFFECTS AND METHOD FOR CREATING A DISTORTED IMAGE

CROSS-REFERENCE TO RELATED APPLICATION

This application claims the priority, under 35 USC §119 (e), of U.S. Provisional Application No. 61/222,194, filed Jul. 1, 2009, which is fully incorporated herein by reference.

BACKGROUND OF THE INVENTION

1. Field of the Invention

The invention relates to a lighting fixture and a method for creating visual effects through the use of a light box, an image and a light source within the light box, behind the image. The invention also relates to a method for creating a distorted image.

2. Description of the Related Art

U.S. Pat. No. 2,334,750 describes and shows a viewing device having a clay mask mounted in a housing with a viewing window at the front of the mask and a lamp illuminating the front of the mask. When viewed from the front, the 3-dimensional mask gives the illusion of moving as the viewing angle changes. A cabinet is used to shield the mask from extraneous light.

U.S. Pat. No. 6,769,783 discloses an imaging device having a light source formed by a plurality of LEDs with different colors. The light source is placed in a lamp seat of a main body and projects light to a concave portion of the main body. Since the colored light source is located in the lamp seat, the light is not spread.

U.S. Pat. No. 5,407,391 teaches the illumination of a negative bust mold formed of thin translucent material, in which the flattening of soft edges permits an illusion to extend behind a region of negative relief. The apparatus provides the illusion that the eyes of the bust move with the viewer by using a particular ratio of depth to width and viewing angle.

U.S. Pat. No. 5,782,698 discloses an optical illusion device in which a surface is illuminated at a relatively great distance by a rear illumination lamp, either with or without an enclosure. The surface has altered shading which serves to darken surfaces at a higher relief and lighten surfaces at greater relief and artificial shadowing is added at critical areas. In addition, color is provided on the surface to create a realistic optical illusion. The disadvantages of the distance between the surface and the illumination lamp are minimized by using several spread light sources or one light source that is flat and parallel to the facial areas.

U.S. Pat. No. 7,703,227 teaches an illuminated poster frame having a frame box, a light source with dimmable LEDs and a power source. The poster is color compensated to produce a natural look even when the LED light source is amber in color.

U.S. Patent Application Publication No. 2009/0232360 A1 shows a method of making a thermoformed article with pre-print distortion, in which deep draw forming carrying a grid distortion pattern is made for each cavity. It is stated that the grid is used to collect the distortion, but no details are given as to how that is done. An outline of critical areas is drawn and then translated back to an image editing program.

U.S. Pat. No. 5,040,005 discloses a method of creating 3-dimensional displays using predistorted images. The method includes projecting multiple photographic perspective views of a 3-dimensional object onto a topographically correct surface and vacuum forming an image without distortion.

The main disadvantages of the prior art are that the light is not spread and is not located at the ideal location and/or distance relative to the concaved shape. All of the devices suggested in the prior art will result in either a poor effect or in a relatively large, non-aesthetic device.

BRIEF SUMMARY OF THE INVENTION

It is accordingly an object of the invention to provide a lighting fixture and a method for creating visual effects as well as a method for creating a distorted image, which overcome the hereinafore-mentioned disadvantages of the heretofore-known devices and methods of this general type and which accomplish an effect that is much more impressive and vivid than the prior art and works in most light environments with a wide effect angle of approximately 110 degrees. It is furthermore an object of the present invention, to create a relatively thin light box where the light source is located close to the image, yet the light is evenly spread. The light should be spread in such a way that it casts the required shadows without creating "glowing spots." It is additionally an object of the present invention to create a device with interchangeable panels or images to enhance the user's enjoyment. In addition:

an enclosed light box is used with replaceable face panels to create different effects;

the light box can be placed on a flat surface or hung on a wall;

the proportions of the 3-dimensional image are to be preferably between 3:1 and 4.5:1 (height:depth). These proportions result in a relatively wide effect angle, of approximately 110 degrees.

the light box has several spread light sources that mimic light rays from the sun which arrive from an infinite distance or alternatively an intense light panel (or panels) with evenly spread light; this light spread improves the effect and allows a thin light box with proportions of between 7:7 and 7:21 M:B (mold:box or depth of the 3-dimensional mold:depth of the light box).

the light is preferably derived from the back of the face and ideally; most of the light should come from above;

a 3-dimentional image and a 2-dimentional background which are very colorful and detailed are used, to create a more entertaining experience;

the image is formed by printing distortion and vacuum forming; and the depth of the image and the distance between the image and the light source are set at their most optimal ratio.

With the foregoing and other objects in view there is provided, in accordance with the invention, a lighting fixture for creating visual effects. The lighting fixture comprises a light box having an interior, a reflective inner surface and an opening. A plate covers the opening of the light box. A 3-dimentional image is disposed on the plate and has a first depth. At least one light source is disposed in the interior of the light box for illuminating the image with evenly spread light to avoid so-called "glowing spots" on the image. The light source is disposed at a second depth behind the image. A ratio of the first depth to the second depth is between 7:7 and 7:21 and preferably approximately 7:9. Optionally, a frame may be disposed at the opening and a screen affixed to the frame. The device advantageously accomplishes an effect that is much more impressive and vivid than that which is possible by using the prior art and works in most light environments as well.

In accordance with another feature of the invention, the plate has 3-dimensional mold height and mold depth proportions of between 3:1 and 4.5:1, the image has a top, a bottom, a left side and a right side, and the at least one light source spreads the light with a wide effect angle of approximately between 90 and 120 degrees, and preferably approximately 110 degrees, between the top, the bottom, the left side and the right side.

In accordance with a further feature of the invention, the plate is one of a plurality of interchangeable plates having different images disposed thereon for creating different effects. This allows the consumer to change images for different occasions, etc. while reusing the light box and light source.

In accordance with an added feature of the invention, the at least one light source is disposed on a printed circuit board. In order to cause the most amount of light to fall upon the image, the printed circuit board may have a reflective surface facing the interior of the light box. The at least one light source may be a light panel, such as an EL panel, or a plurality of lights, such as LEDs, disposed in predetermined positions for illuminating the image in predetermined locations and avoiding direct illumination of protruding portions of the image. The lights preferably have a Kelvin temperature color of between 4000 and 13000. The lights should direct more light from an upper portion of the image than from a lower portion of the image to mimic natural light from the sun. The predetermined positions of the lights create shadows under outwardly convex portions of the image facing away from the interior.

In accordance with an additional feature of the invention, a leg is provided for supporting the light box in a predetermined position on a surface. A hanger may be provided for hanging the light box on a wall. This allows the consumer to chose any desired display location.

In accordance with yet another feature of the invention, the plate having the 3-dimentional image may have a 2-dimentional background and the image may contain 2-dimensional and 3-dimensional color artwork. The image may be formed by printing distortion and vacuum forming.

The light box is preferably formed of opaque material, the plate is preferably formed of translucent material and the image preferably has a matte surface. These materials have been found to provide the greatest enhancement to the effect created by the invention.

With the objects of the invention in view, there is furthermore provided a method for creating visual effects. The method comprises providing a light box having an interior, a reflective inner surface and an opening, providing a plate with a 3-dimentional image having a first depth, covering the opening of the light box with the plate, placing at least one light source at a second depth behind the image in the interior of the light box, setting a ratio of the first depth to the second depth of between 7:7 and 7:21, and preferably approximately 7:9, and illuminating the image with evenly spread light from the at least one light source.

All of the features of the device may also be used in the method, such as the interchangeable plates, the wide effect angle, the illumination of the image in predetermined locations with a plurality of lights disposed in predetermined positions or a light panel, directing more light from an upper portion of the image, creating shadows and using printing distortion and vacuum forming.

With the objects of the invention in view, there is concomitantly provided a method for creating a distorted image. The method comprises preparing a 2-dimensional image, sculpting a 3-dimensional model, vacuum forming and running a 3-dimentional grid, drawing a distorted outline onto a 2-dimentional grid with photo management software, digitally matching and stretching an original image to match the outline and removing the outline leaving the distorted image. This method provides the desired effect without employing more expensive techniques and equipment used in the prior art.

Other features which are considered as characteristic for the invention are set forth in the appended claims.

Although the invention is illustrated and described herein as embodied in a system and a method for creating visual effects through the use of a lighting fixture, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE SEVERAL VIEWS OF THE DRAWING

FIG. 1 is a diagrammatic, exploded, perspective view of a system according to the invention for creating visual effects through the use of a lighting fixture;

FIGS. 2A-2E are respective front-perspective, right-side elevational, front-elevational, left-side-elevational and rear-perspective views of a light box according to the invention;

FIG. 3 is a perspective view of a leg according to the invention;

DETAILED DESCRIPTION OF THE INVENTION

Figure 4:
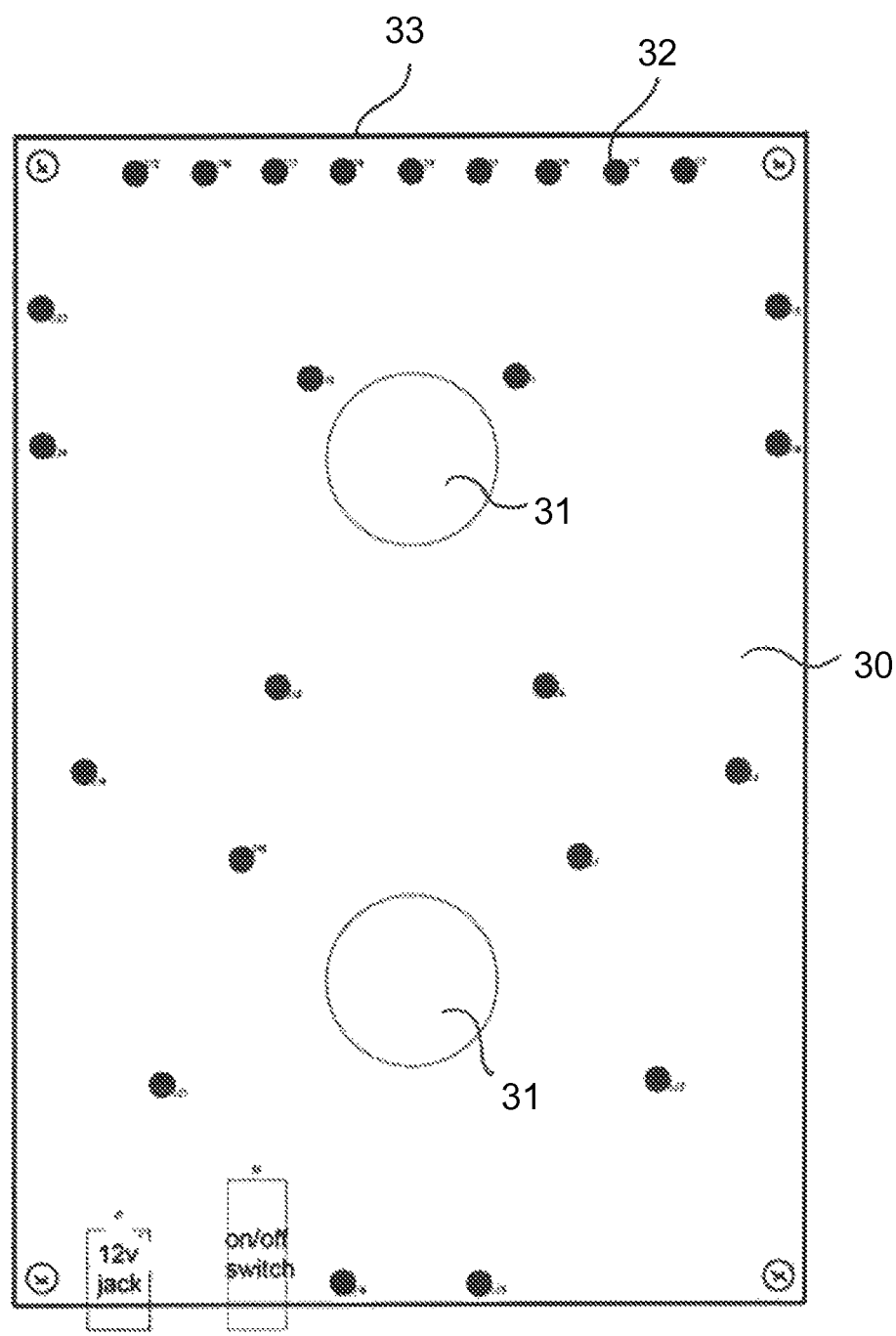
FIG. 4 is an elevational view of a printed circuit board with light sources according to the invention.

Referring now to the figures of the drawing in detail and first, particularly, to FIG. 1 thereof, there is seen an exploded, perspective view of a lighting fixture according to the invention, including a light box 10, a leg 20, a printed circuit board (PCB) 30, interchangeable image molds or plates 40 mounted on an opening 24 of the light box and having a 3-dimentional image 50, a screen 60 and a frame 70.

As is seen in FIG. 2A, the light box 10 is generally concave or frusta-pyramidal in shape, although the invention is not limited to such a shape since any geometrical shape having an open space in an interior 17 will suffice and may be chosen based on aesthetics or other requirements of the user of the system. The light box 10 may be opaque, although any other finish would be acceptable and may be formed of metallic, polystyrene, ABS plastic material or any other material and should have an inner surface 18 which is glossy and white, silver or otherwise reflective. The interchangeable image or face plates 40 should be translucent. The thickness of the plastic material of the interchangeable image or face plates 40 is between 0.010 and 0.120 mil and is preferably 0.030 mil. The outer surface 19 of the light box 10 may be matte. Pockets 11 are formed in the light box 10 for receiving a leg 20 which may be straight or angled as shown in FIG. 3. The leg 20 has slots 21 defining a tab 22 with a bent-up portion 23 for snapping into one of the pockets 11. The leg 20 has a rounded surface for allowing the light box 10 to stand horizontally or vertically on a surface for display purposes. The light box 10 also contains a direct current module 12 seen in FIGS. 2A-2D having a jack for receiving a plug 13 connected to another plug 14 for a wall outlet as seen in FIG. 2E. Finally, the light box 10 has hangers or tabs 15 for receiving hooks, screws or nails to mount the light box 10 on a wall.

The PCB 30 is seen in detail in FIG. 4 as having two openings 31 aligned with the tabs 15 of the light box 10. The surface of the PCB 30 is preferably white or silver or otherwise reflecting. A light source having a plurality of light emitting diodes (LEDs) 32 is disposed in a pattern on the PCB 30. A row of the LEDs 32 extends along an upper edge 33 of the PCB 30 so as to provide more light at the top of the light box 10 than elsewhere.

The light is distributed in such a way that more light arrives from the upper part of the light box and less light arrives from the bottom because this simulates the spreading of light that occurs in nature, since the sun is usually located above the viewer and shadows usually occur at the bottom of facial features. The ideal effect is created with an illumination source such as natural sun light because the sun is located at infinity and results in parallel beams that arrive from the horizon. Such beams create an evenly lighted image with very sharp and clear shadows below the critical areas (eyes, nose and chin). The light box according to the invention is constructed in such a way as to mimic the beams coming from the sun. Although such a layout with more light arriving from the upper part of the light box is preferred, other layouts, such as with more light coming from the bottom or evenly spread light, will also work. The light source must be placed at the back of the concave mold to provide a backlight. Placing the light behind the concave image or face will cast shadows that confuse the viewer into believing that the face is convex and eliminate light coming from the surroundings of the device.

In order for the light box to be as decorative and thin as possible, it is better to place several LED bulbs in strategic locations. The amount of LED bulbs may vary according to the size of the light box and the intensity of the bulbs. It is suggested to use between 10 and 100 LEDs in strategic locations. It is also noted that it is not absolutely necessary to use LEDs, since any other type of spread light source would also be acceptable. This method enables the face to be brought as close to the light source as possible and the use of a thinner light box. A dimmer may be added to control light intensity. The bulbs are spread evenly in such a way as not to create "glowing spots" on the face. For example, "profound" face features such as eyes, nose and lips should be "bulb-free." Although a panel with LED or OLED bulbs is currently the best solution, the invention contemplates the use of alternative light panels (such as a stronger EL or electroluminescent light than is currently available) or any other adequate light panel technology which may provide intense illumination. It is recommended to use bright light (at a color temperature of 4000-13000 Kelvin). Bright light sources will result in more vivid colors when diffused through the translucent material and illuminate the image.

The light coming from within the light box should have higher intensity than the ambient light coming from the surroundings outside the light box. For example, the effect is less impressive in a very well-lighted room. A strong external light source may ruin the effect because the viewer might notice that the face is indeed concave. The face or image mold is preferably made of a matte material in order to eliminate light from the surroundings and to minimize light reflected from the surroundings.

Additionally, it is suggested to use a tinted film on the frontal clear panel or screen 60 (such as is used for car windows) to block light coming from the surroundings. Such a film will prevent the viewer from seeing the concave mold. The viewer will either see the effect, that is a convex image (when light within the light box governs) or will see a dark/silver film (when light from surrounding governs).

The depth of the face mold is approximately 7 cm and the depth of the light box is approximately 10 cm. The system can be made in any size but it preferable to make it larger rather than smaller than that size. In order to create a slim light box it is ideal to bring the light source as close as possible to the figure (without ruining the effect). Thus, the invention uses a dept ratio of 7:9 (depth of the face or image mold:depth of location of the light box). An ideal ratio would be 7:7 (where the light source is located directly on the image, but that would not cast the desired shadows and/or it would cause glowing spots on the image, although that problem may be solved in the future. However, it has been found that a dept ratio range of between 7:7 and 7:21 provides an acceptable effect with an esthetic light box. Stated another way, the image 50 has a first depth, the light source 32 is disposed at a second depth behind the image 50, and a ratio of the first depth to the second depth is between 7:7 and 7:21.

Figure 5:
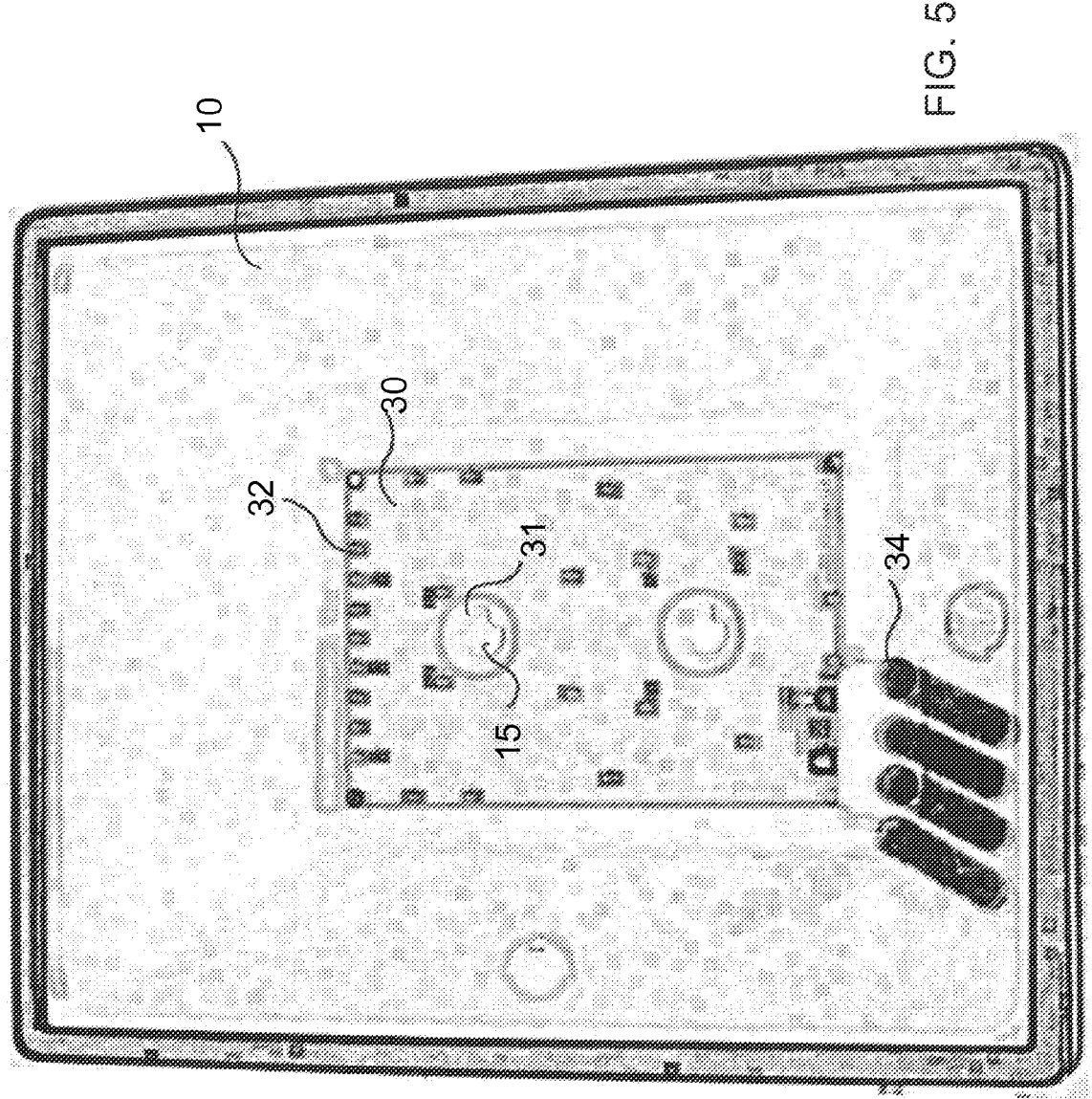
FIGS. 5 and 6 are elevational views of an interior of the light box containing the printed circuit board.
Figure 6:
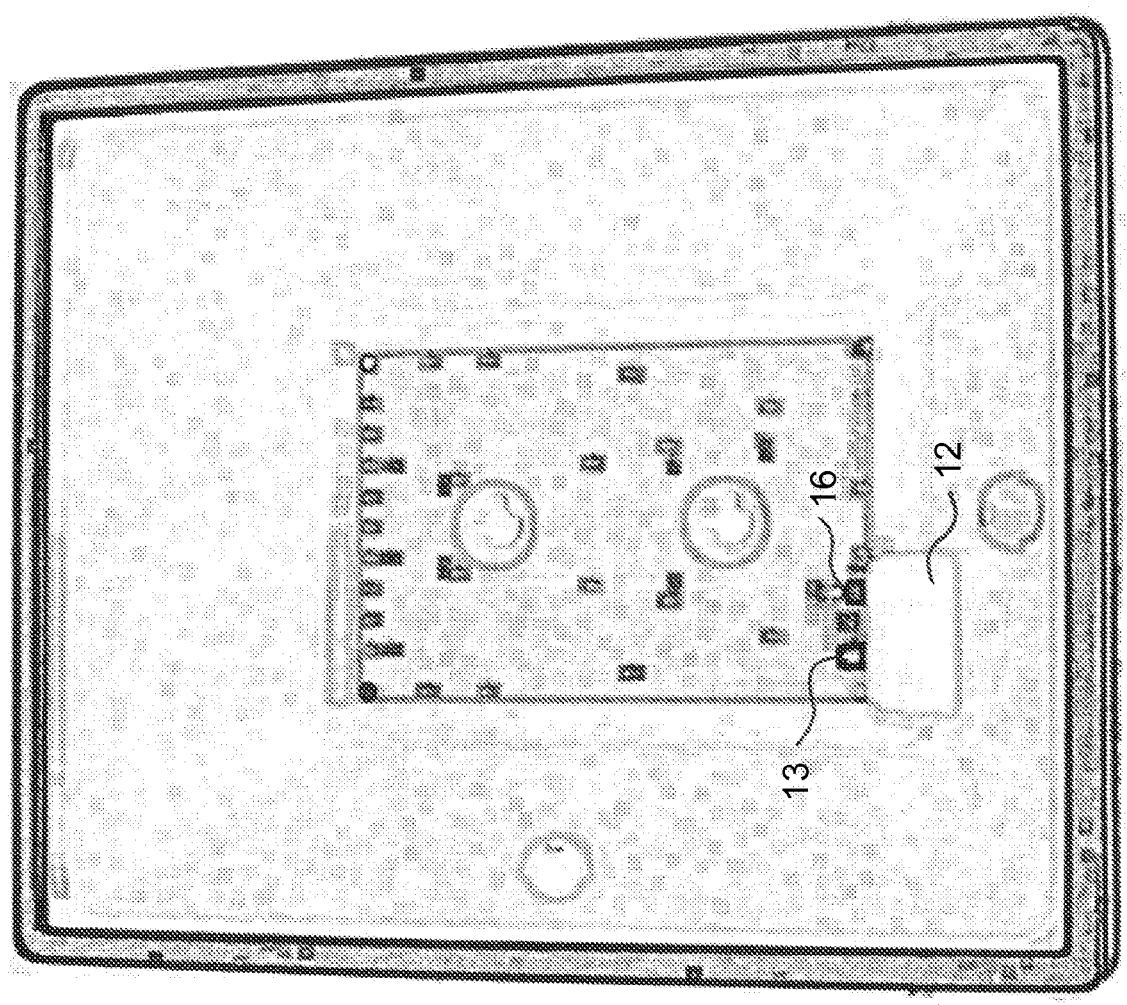
Figure 7:
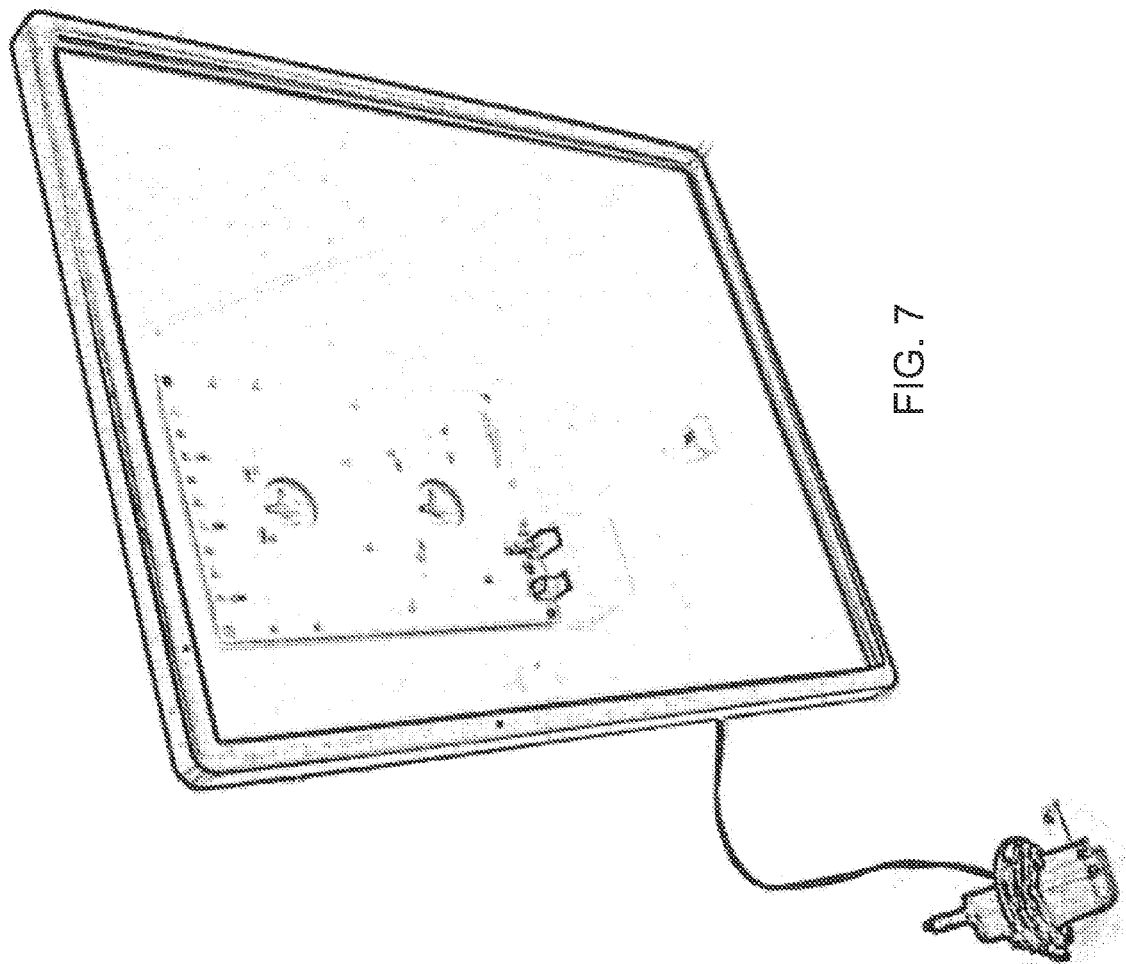
FIG. 7 is a view similar to FIGS. 5 and 6 showing the printed circuit board off-center in the light box.
Figure 8:
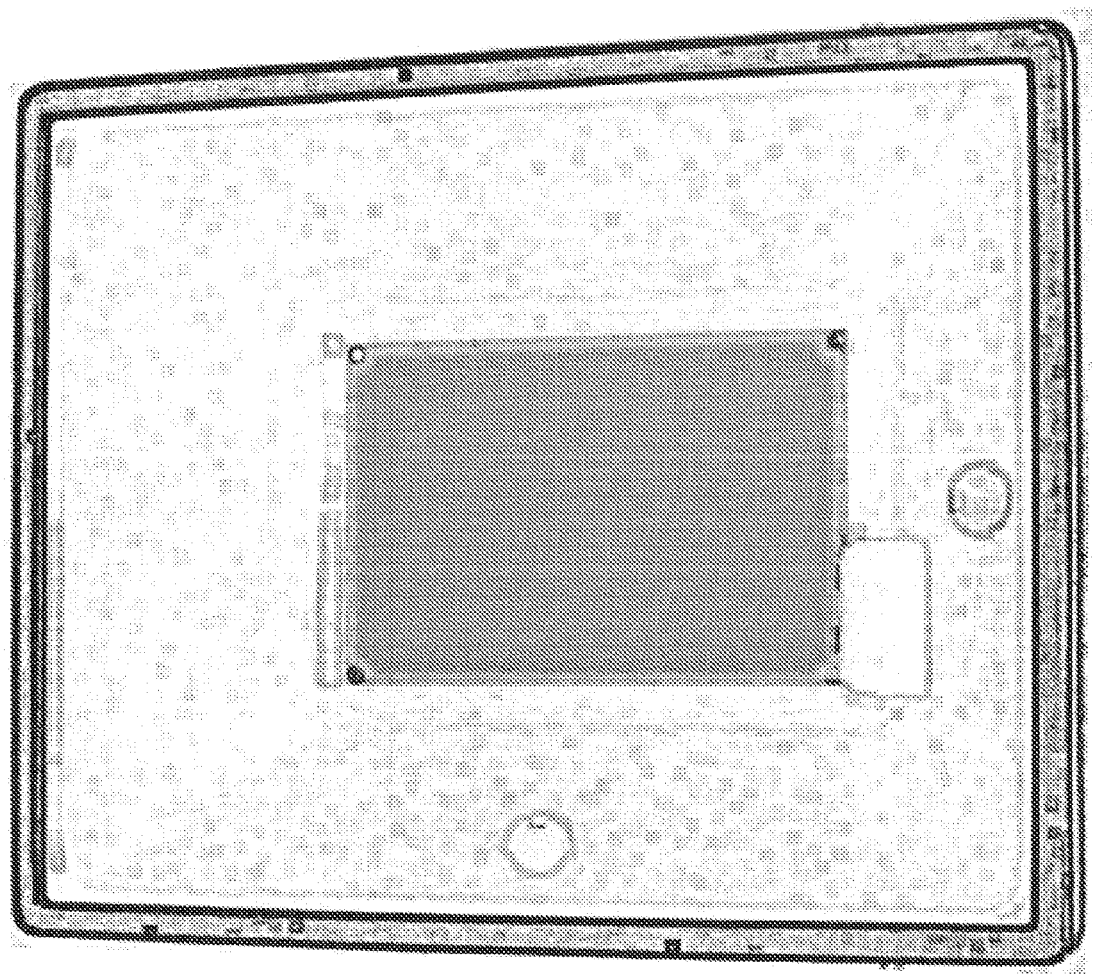
FIG. 8 is a view similar to FIGS. 5 and 6 showing an EL light instead of lights on a printed circuit board.

Although the ideal light source for the present invention would be one that casts a completely homogeneous light throughout, like the natural light of the sun, an artificial light source which is available currently is an EL light. However, it has been found that today such alternative panels (EL lights) are not strong enough to effectively illuminate the image 50. On the other hand, the use of a single light source as in the prior art is the opposite of a homogeneous or evenly spread light. FIGS. 5 and 6 show the PCB 30 viewed from the center within the light box 10, whereas FIG. 7 shows it viewed from a side angle. FIG. 5 also shows that the LEDs 32 can be powered by batteries 34 instead of the module 12, jack 13 and on/off switch 16 shown in FIG. 6. In contrast, FIG. 8 illustrates that a light panel with evenly spread light, such as an EL Panel, can be used instead of individual LED lights, as the light source.

Figure 9:
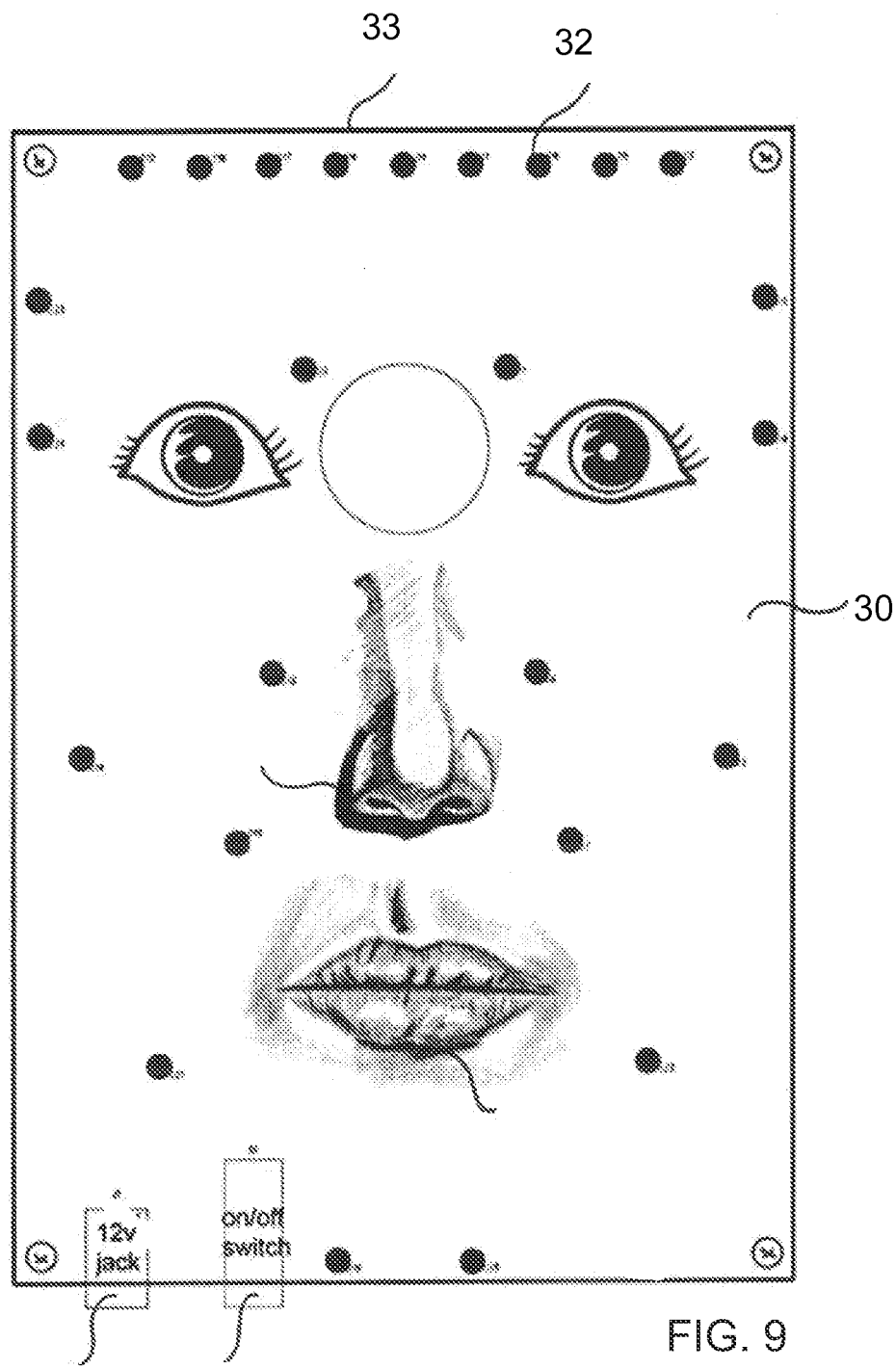
FIG. 9 is an elevational view of the printed circuit board with light sources and an image superimposed thereon to show relative positioning.
Figure 10:
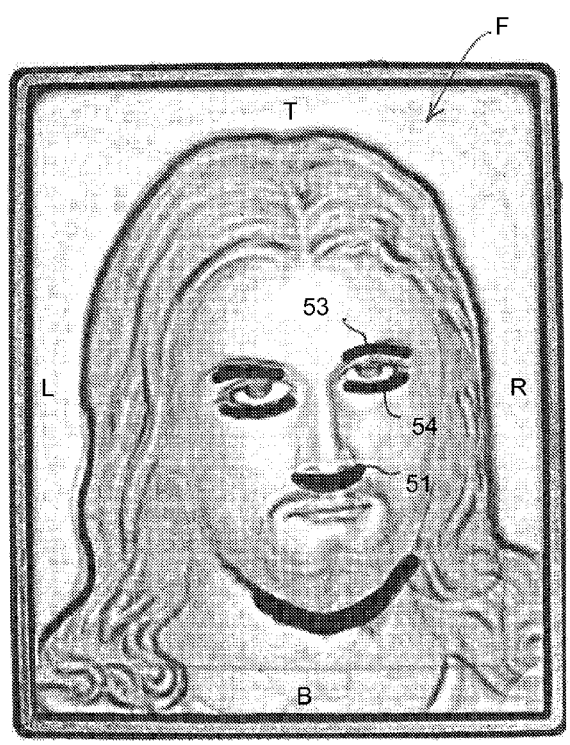
FIG. 10 is an elevational view of an image in which shadows cast by the light sources have been emphasized.

FIG. 9 illustrates a possible distribution of the LEDs 32 by superimposing an image in the form of a face on the PCB 30. Although the LEDs 32 are concentrated along the upper edge 33 of the PCB 30, all of the LEDs are located in such a way as to cast shadows under certain features of the image, such as a shadow 51 under the nose and a shadow 52 under the mouth. The shadows 51, 52 as well as shadows 53 under the brows, shadows 54 under the eyes and a shadow 55 under the chin, are shown in FIG. 10. The strategic placement of the LEDs also allows the image to be brought closer to the light sources and therefore permits the light box to be as thin as possible. With reference to FIG. 10, the image may be described as having a top T, a bottom B, a left side L, a right side R, a front F and a back which cannot be seen in the figure.

Figure 11:
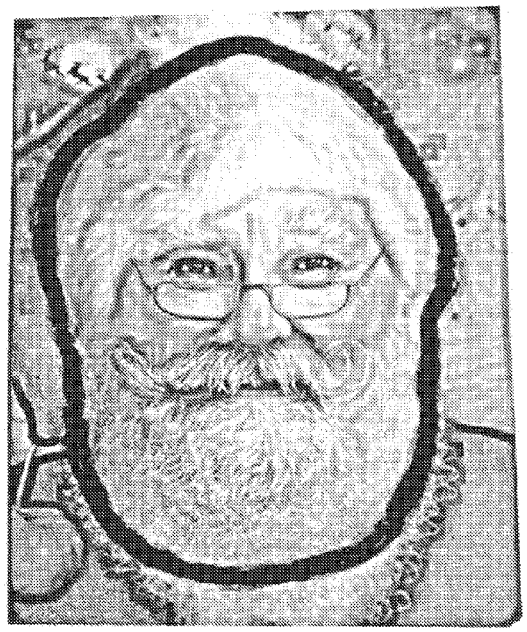
FIG. 11 is an elevational view of an image in which a separation between 3-dimentional and 2-dimentional areas has been emphasized by a black line.
Figure 12A:
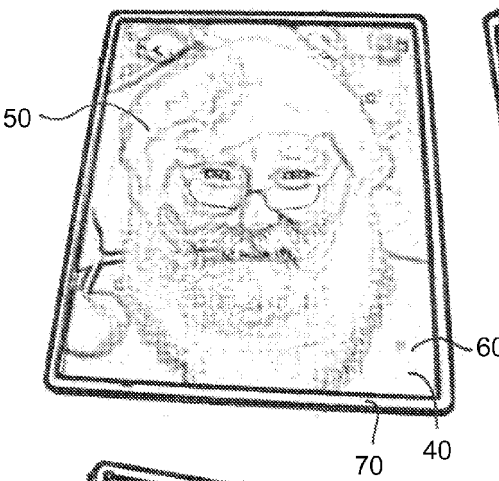
FIGS. 12A-12D are perspective views of an image as seen from different directions.
Figure 12B:
Figure 12C:
Figure 12D:

FIG. 11 shows a thick black line 56 all around the image marking and emphasizing a separation between 3-dimentional and 2-dimentional areas and showing how some facial features extend from the 3-dimentional to the 2-dimentional areas, namely a beard and a hat, etc. This technique improves the effect and creates a more vivid image.

FIGS. 12A-12D show the image 50 on an interchangeable mold 40, the screen 60 and the frame 70. The interchangeable image or face molds 40 should be as detailed and as textured as possible to improve the visual effect. The details of the image can appear either on the 3-dimensional mold or on the graphics of the corresponding image. A detailed face will cause the proportions to change more quickly, when the viewer moves in front of the light box. In order to facilitate the manufacturing process, it is preferable to provide a very detailed 2-dimensional image and fewer details on the 3-dimensional mold.

The face mold can be in a natural color or in full color. A full color face mold is created by a printing distortion technique, which will be explained in detail below. Printing of graphics can be done by screen printing or lithographic printing on a matte surface, although other printing techniques are suitable as well. A dark background will improve the contrast and the effect. The background can carry a graphics with the same theme as the image or face (such as a background showing buildings or scenes which are associated with the face or image, i.e. reindeer and snow-covered mountains associated with Santa Claus). Some facial features may be extended onto the background (changing from 3-dimentional to 2-dimentional). For example, this may include a beard, a hat, a shirt and shoulders. This technique may create a more vivid and detailed face while keeping the "conical shape" of the face as deep as possible within size restrictions.

The interchangeable face or image molds 40 may use lenticular technology or lenses to provide a 3-dimentional depth or motion effect and enhance the 3-dimentional effect. The system may include additional elements, such as a motion sensor, a voice, light bulbs with changing colors or a so-called try me button. The image or face mold may be mounted inside a full body or life-size figure (2-dimentional or 3-dimentional) such as a doll or a statue, or inside a larger device (vending machine, wall, cardboard figure, mannequin, etc.).

It can be seen that due to the location of the LEDs 32, the distance between the LEDs 32 and the image 50 and the distribution of the LEDs 32, the image 50 and in particular the eyes in the face mold seems to move with the viewer. In other words, when the viewer is below the image, the image appears to look down at the viewer as in FIG. 12A. When the viewer is above the image, the image appears to look up at the viewer as in FIG. 12B. Similarly, when the viewer is at the left or the right of the image as in FIGS. 12C and 12D, respectively, the image still appears to look at the viewer. Therefore, as the viewer moves from one side to other side or up and down relative to the light box (or as the light box moves relative to a stationary viewer), a visual effect of the eye balls and face or image mold following the viewer is created and the overall visual affect is most unusual.

It is also possible for the pupils to be placed in the back of the eye socket (that is, not on the same plane) to create an illusion that the pupils follows the viewer, as with the Mona Lisa. The face mold should be as detailed and as textured as possible to improve the shadow effect. The image on the face plate is not limited solely to a human face, rather any "conical shape" image may be used.

Figure 15:
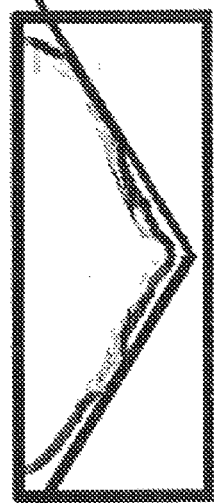
FIG. 15 is a top-plan view of the light box, on a reduced scale, indicating a viewing angle of 110° and three different positions of observers opposite a light box.

The shadows below the chin, the nose and the eyes mentioned above substantially improve the visual effect and convince the viewer that the face is convex. Therefore, it is preferable to leave some translucent space below the chin, where the shadow can be seen. As was also mentioned above, the interior 17 of the light box should be bright and reflective. The depth face proportions can be distorted to a certain degree. As is seen in FIG. 15, this technique allows a thinner light box and a wider effect angle (approximately 90-120 degrees and preferably about 110 degrees). It is recommended to maintain a ratio of approximately between 3:1 and 4.5:1 (height:depth). It is most preferable to use a proportion of 3.8:1 that will result in the wide effect angle of approximately 110 degrees. Additionally, the face mold can be painted with translucent paints to create a more colorful image. The background of the face or other image should be of a dark color to improve the contrast and the effect. It is optional to provide a quotation, a saying or a logo on the device mold. The face or image mold should avoid any undercuts (angles less the 90 degrees) that may ruin or diminish the effect.

Figure 14:
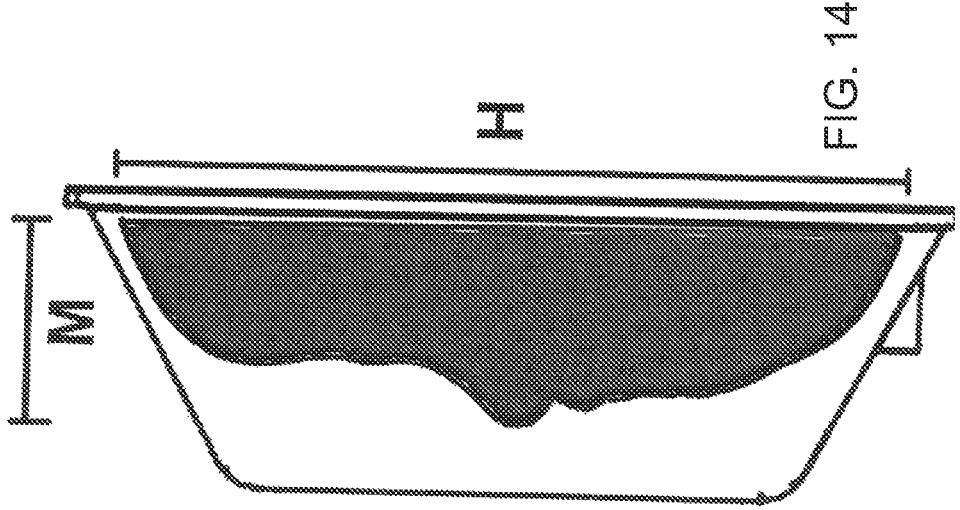
FIG. 14 is a view similar to FIG. 13, illustrating proportions of the image as a ratio of height:depth H:M.
Figure 13:
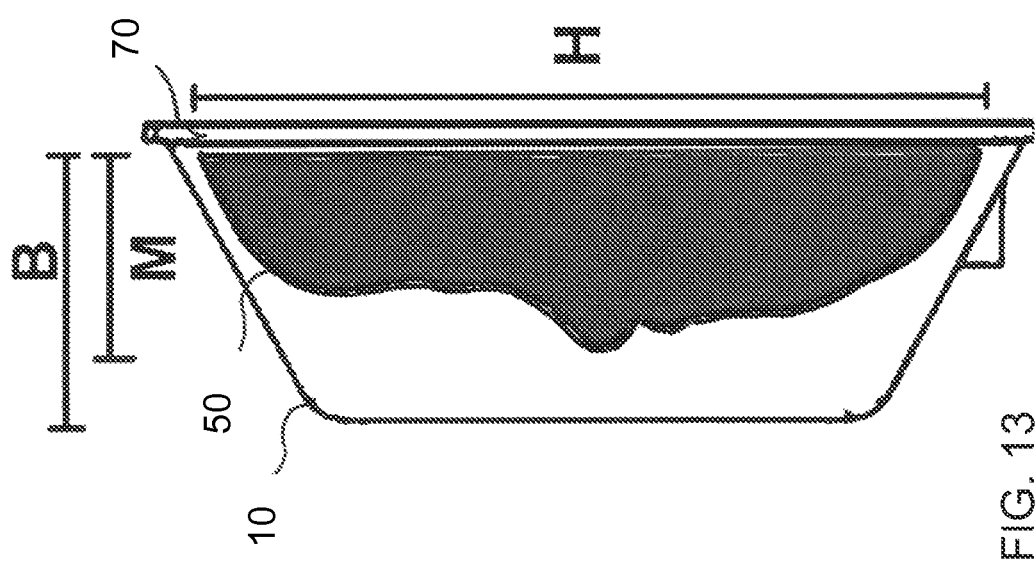
FIG. 13 is a longitudinal-sectional view of the light box, showing a ratio between the mold depth and light box depth M:B.

FIG. 13 shows a mold of an image 50 in a frame 70 within the light box 10. The relative size or ratio between the mold depth M, the light box depth B and the mold height H are indicated in the figure. FIG. 14 is a view similar to FIG. 13, indicating relative proportions of the mold depth M and mold height H.

As mentioned above, the image or face 50 may be created on the interchangeable molds or plates 40 by a sculpting and distortion technique, as follows:

Sculpting:

The sculpting begins by choosing a 2-dimentional image that is used as a reference for the artist. The image can be provided by a licensor or can be created by an artist. It may be desirable to use several images taken from different angles.

It is preferable to choose an image with a face that looks straight forward but a slightly tilted head can also be used.

It is recommended that the character's eyes be relatively open, since the viewer will eventually focus on them when enjoying the effect.

It is ideal to choose an image with as many details as possible (wrinkles, hair, earrings etc.) since a relatively detailed face will result in a better effect.

The image should also show the background of the character. In some characters, the background may be an extension of the face details (e.g. Santa Claus) and therefore it is necessary to have the background ready before sculpting is begun.

Sculpting can be done either digitally (using MAYA, MUDBOX, ZBRUSH, or any other 3-dimensional software) or manually (by using clay, plaster, "Sculpey" or any other paste). Digital printing is found to be more convenient and accurate.

The faces size should be approximately 10.5" high×8.5" wide and 2.75" deep. (In cm: 26.7×21.6×7 cm). The above are only suggested dimensions. The model can have any different proportions. It is recommended to maintain the ratio of approximately 3.8:1 (height:depth) when the image is that of a head or a face, although a range between 3:1 and 4.5:1 will also provide a good effect. However, other images, such as several faces side by side, a bottle or a fist, etc., may have different proportions.

In the sculpting process, the artist creates a "bust-like" model in the shape of a "bas relief," meaning that only the front part of the character is sculpted, from shoulders to crown. In most cases, only the face is sculpted (without the shoulders) and the rest of the details would appear in the 2-dimentional background of the finished piece.

In the sculpting process, the artist ignores small details, such as earrings, glasses, moles, hair lines, cracks between the teeth, wrinkles, etc. The above details would appear in the 2-dimentional corresponding image rather than in the 3-dimentional model. It has been found to be redundant to sculpt such details. Manufacturing-wise, it is very difficult to match such details in a vacuum forming process. Additionally, the viewer cannot really discern between a 3-dimentional mole and a 2-dimentional mole.

It is recommended to avoid sharp facial parts or undercuts in the 3-dimentional model. Those areas are very hard to match in the vacuum forming process and may diminish the effect. All facial details should be smooth and soft.

The digital 3-dimentional model should be made in a mirror-image style (reverse order), for example, Marilyn Monroe's mole, should be in on opposite side. After the vacuum forming process, the face would return to its original style.

Once the 3-dimentional digital file is ready, tooling is created by CNC, Rapid Prototype or any other 3-dimentional printing technique.

Figure 16A:
FIGS. 16A-16G are elevational views of an image, illustrating steps of a distortion process.

Distortion:

The distortion process, which is explained in detail below and is illustrated with the help of FIGS. 16A-16F, may be summarized by the following steps:

Step 1—prepare a 2-dimentional image, as seen in FIG. 16A.

A graphic designer creates a 2-dimensional rendering image. Such an image will have both a 2-dimensional background and areas that are going to become 3-dimensional. The graphic design for such an image can be created by any of the following manners: it can be drawn by an illustrator, it can be received from a licensor or a third party artist (e.g. a motion picture studio) or it can be purchased from a so-called "royalty free" image owner (e.g. www.istockphoto.com). Such an image will have both the 2-dimensional background and the areas that are going to become 3-dimensional. At this point the sculptor should plan the outline of the 3-dimensional model. The sculptor may use several images with different angles (side view, front view, etc.) to have a better understanding of the proportions of the 3-dimensional model.

Figure 16C:
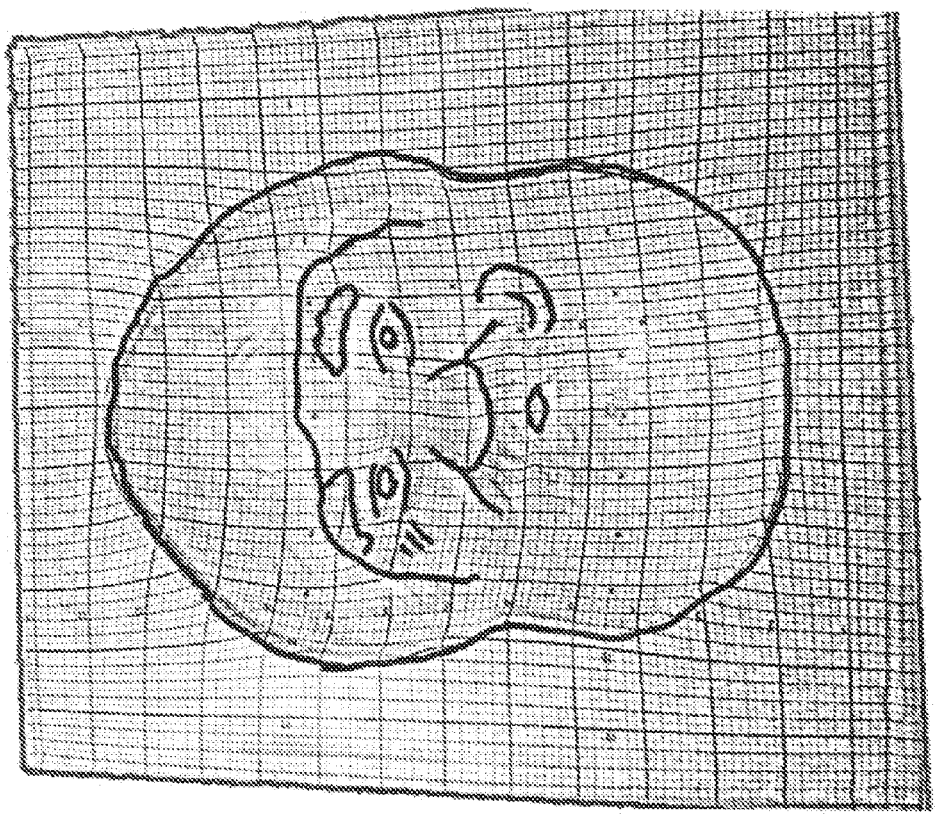
Figure 16B:
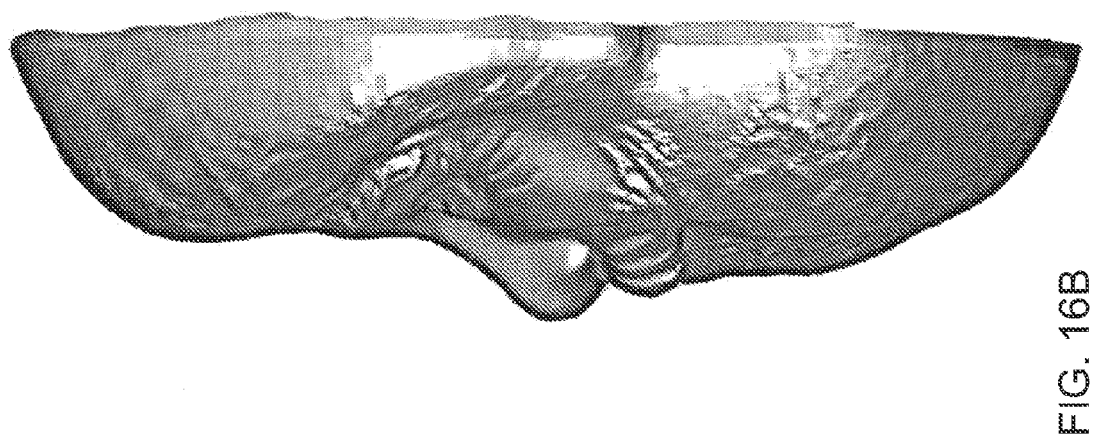

Step 2—sculpt a 3-dimentional model, as seen in FIG. 16B.

The sculptor will create a 3-dimensional model according to the 2-dimensional rendering image(s). A 3-dimensional model can be sculpted by hand (using clay, "sculpey," etc.) or can be sculpted on digital software ("3-dimensional max", "zbrush" "maya", "mudbox," etc.). The sculpting should be done according to the proportions that correspond with the effect and/or limitations of the light box (for example, face proportions 3.8:1).

Step 3—create a mold for vacuum forming, as seen in FIG. 17B.

If the model was created by hand, the original material (clay) should be converted into a more rigid mold by using a female cast (e.g. pouring aluminum or epoxy into a rubber cast). If the model was created digitally, the physical mold can be formed either by CNC (Computer Numerical Control), by a milling machine or by Rapid Prototyping Technology (e.g. "zcorp"). Additional 3-dimensional printing techniques can be used as well.

Step 4—vacuum form and run a 3-dimentional grid, as seen in FIG. 16C.

In order to predict the distortion of the graphics in the vacuum forming process, initially one vacuum shot with a grid is run. The printed grid should be as fine as possible to be able to "read" all of the distortions accurately. Preferably, the grid should be printed on the same material that is used for production, and the vacuum shot should be done under the same variables that would be used in production (the variables are, for example, the type of machine, temperature, material, registration, etc.). Otherwise, the distortion will not be representative.

Figure 16D:
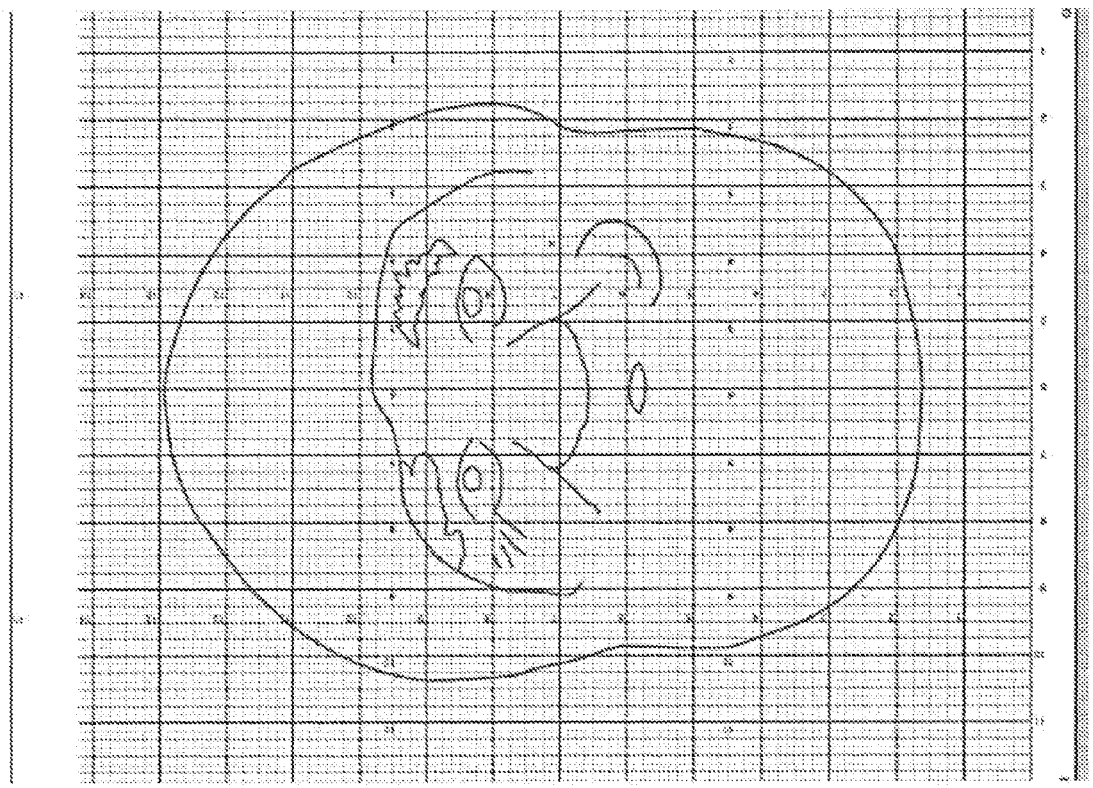

Step 5—translate the distorted outline onto a 2-dimentional grid in image editing software, as seen in FIG. 16D. In order to learn the distortion, the distortion outline of the 3-dimentionally formed grid is translated into image editing software (e.g. "photoshop" or "illustrator"). In order to facilitate this process, it is recommended to first mark the outline of the face (with a marker) and then copy the same outline onto the original 2-dimentional grid in the graphic design software. The graphic designer will first manually mark the outline of the image on top of the physical grid. For example, if the image is of a face or a head, such outline should include the shape of the head, shoulders, ears, eyes, hairline, nose, mouth, smile shape, moles, earrings, glasses and pupils, etc. After the outline is drawn on the physical grid, the graphic designer will copy the same outline on top of the original in a digital grid. The result of the above conversion process would be a 2-dimensional digital outline of a "flat" outline.

Figure 16E:
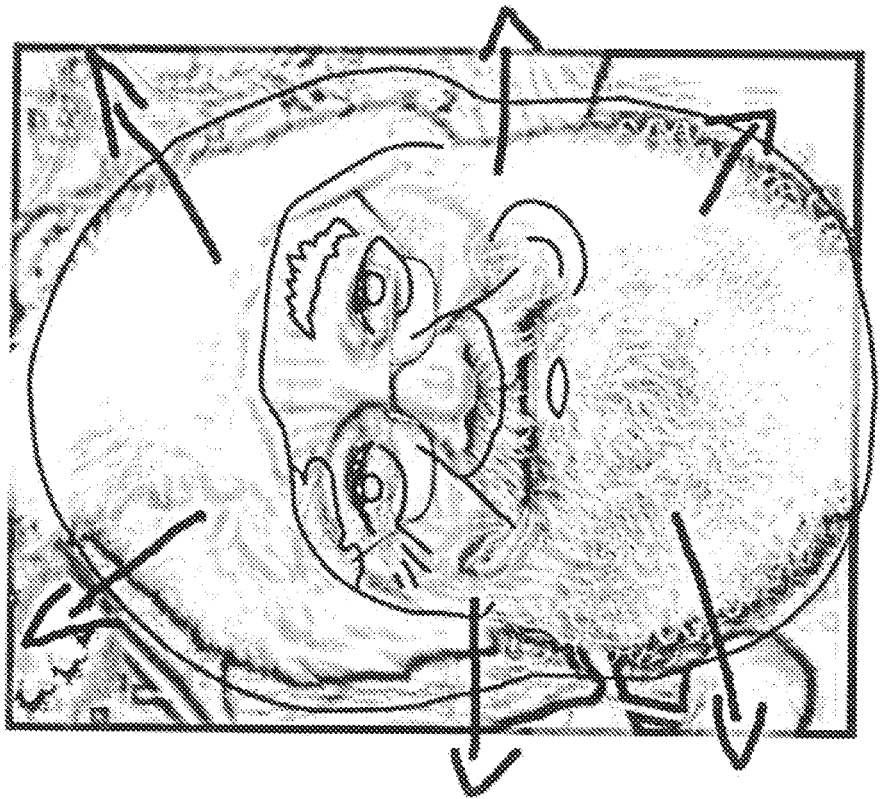

Step 6—stretch the original image to match the outline, as seen in FIG. 16E.

At this point, the grid should be removed and the original 2-dimentional rendering image should be placed on top of the distorted "flat" outline in the image editing software. The rendering image should be "stretched" to match the distorted outline (as one would stretch a sheet on a mattress). All of the facial parts of the rendering image should match the facial parts of the distorted outline. The background of the image should also be distorted slightly at this point.

Figure 16F:
Figure 16G:

Step 7—the image matches the distorted outline, as seen in FIG. 16F.

A completed stretching process of a distorted image on top of a distorted outline is shown in the figures.

Step 8—remove the outline to be left with the distorted image, as seen in FIG. 17G.

Once the matching is completed, the distorted outline will be removed.

After the stretching process, the stretched image would appear "flat" as compared to the original rendering image.

Step 9—printing and registration:

The stretched image should be then printed on top of the required material. Printing technology varies according to the required amount of prints. Digital printing should be used for few prints. Lithographic or screen printing should be used for larger quantities. The image should be printed on top of the side that faces the mold (concave side). In order to have more vivid colors, the image may be printed on both sides of the sheet. Registration between the sheets and the vacuum forming machine should be made at the most precise level. It is recommended to use so-called pin registration or edge registration. The distorted image will return back to its original shape after the vacuum forming process. After the distortion, the panel is trimmed to fit the dimensions of the light box.

The invention claimed is:

1. A lighting fixture for creating visual effects, the lighting fixture comprising:
a light box having an interior, a reflective inner surface and an opening;
a plate covering said opening of said light box;
a 3-dimentional image disposed on said plate, said image having a first depth, said 3-dimentional image extending concavely inward from said plate toward the interior of said light box;
at least one light source disposed in said interior of said light box for illuminating said image with light, said light source being disposed at a second depth behind said image; and
a ratio of said first depth to said second depth of between 7:7 and 7:21.

2. The lighting fixture according to claim 1, which further comprises a frame disposed at said opening and a screen affixed to said frame.

3. The lighting fixture according to claim 1, wherein said plate has 3-dimensional mold height and mold depth proportions of between 3:1 and 4.5:1, said image has a top, a bottom, a left side and a right side, and said at least one light source spreads the light with a wide effect angle of approximately between 90 and 120 degrees.

4. The lighting fixture according to claim 3, wherein said wide effect angle is approximately 110 degrees.

5. The lighting fixture according to claim 1, wherein said plate is one of a plurality of interchangeable plates having different images disposed thereon for creating different effects.

6. The lighting fixture according to claim 1, which further comprises a printed circuit board on which said at least one light source is disposed.

7. The lighting fixture according to claim 5, wherein said printed circuit board has a reflective surface facing said interior of said light box.

8. The lighting fixture according to claim 1, wherein said at least one light source is a light panel.

9. The lighting fixture according to claim 1, wherein said at least one light source includes a plurality of lights disposed in predetermined positions for illuminating said image in predetermined locations and avoiding direct illumination of protruding portions of said image.

10. The lighting fixture according to claim 9, wherein said lights have a Kelvin temperature color of between 4000 and 13000.

11. The lighting fixture according to claim 9, wherein said lights direct more light from an upper portion of said image than from a lower portion of said image.

12. The lighting fixture according to claim 9, wherein said predetermined positions of said lights create shadows under outwardly convex portions of said image facing away from said interior.

13. The lighting fixture according to claim 8, wherein said lights are LEDs.

14. The lighting fixture according to claim 1, which further comprises a leg for supporting said light box in a predetermined position on a surface.

15. The lighting fixture according to claim 1, which further comprises a hanger for hanging said light box on a wall.

16. The lighting fixture according to claim 1, wherein said plate having said 3-dimentional image has a 2-dimentional background.

17. The lighting fixture according to claim 1, wherein said image contains 2-dimensional and 3-dimensional color artwork.

18. The lighting fixture according to claim 1, wherein said image is formed by printing distortion and vacuum forming.

19. The lighting fixture according to claim 1, wherein said light box is formed of opaque material, said plate is formed of translucent material and said image has a matte surface.

20. The lighting fixture according to claim 1, wherein said ratio of said first depth to said second depth is approximately 7:9.

21. A lighting fixture for creating visual effects, the lighting fixture comprising:
a plurality of interchangeable plates;
different 3-dimentional images each being disposed on a respective one of said plates for creating different effects;
a light box having an interior, a reflective inner surface and an opening to be covered by one of said plates with one of said different 3-dimentional images extending concavely inward from said plate toward the interior of said light box; and
at least one light source disposed in said interior of said light box for illuminating said image.

22. The lighting fixture according to claim 21, wherein said images each have a first depth, said at least one light source is disposed at a second depth behind said image, and a ratio of said first depth to said second depth is between 7:7 and 7:21.

23. The lighting fixture according to claim 21, wherein said at least one light source illuminates said image with evenly spread light.

24. A method for creating visual effects, the method comprising the following steps:
providing a light box having an interior, a reflective inner surface and an opening;
providing a plate with a 3-dimentional image having a first depth;
covering the opening of the light box with the plate, with the 3-dimentional image extending concavely inward from the plate toward the interior of the light box;
placing at least one light source at a second depth behind the image in the interior of the light box;
setting a ratio of the first depth to the second depth of between 7:7 and 7:21; and
illuminating the image with light from the at least one light source.

25. The method according to claim 24, which further comprises setting the ratio of the first depth to the second depth at approximately 7:9.

26. The method according to claim 24, which further comprises providing the plate with height, length and depth proportions of between 3:1 and 4.5:1, and spreading the light with a wide effect angle of approximately between 90 and 120 degrees.

27. The method according to claim 26, which further comprises setting the wide effect angle at approximately 110 degrees.

28. The method according to claim 24, which further comprises exchanging the plate with at least one other plate having a different image disposed thereon for creating different effects.

29. The method according to claim 24, which further comprises carrying out the step of illuminating the image in predetermined locations with a plurality of lights disposed in predetermined positions.

30. The method according to claim 29, which further comprises directing more light from an upper portion of the image than from a lower portion of the image with the lights.

31. The method according to claim 29, which further comprises creating shadows under outwardly convex portions of the image facing away from the interior with the predetermined positions of the lights.

32. The method according to claim 24, which further comprises forming the image by printing distortion and vacuum forming.

33. The method according to claim 24, wherein the at least one light source is an EL light panel.

34. The method according to claim 29, wherein the lights have a Kelvin temperature color of between 4000 and 13000.

35. The method according to claim 24, wherein the image contains 2-dimensional and 3-dimensional color artwork.

* * * * *